(12) United States Patent
Pantuso

(10) Patent No.: US 7,093,292 B1
(45) Date of Patent: *Aug. 15, 2006

(54) SYSTEM, METHOD AND COMPUTER PROGRAM PRODUCT FOR MONITORING HACKER ACTIVITIES

(75) Inventor: Joseph J. Pantuso, Springboro, OH (US)

(73) Assignee: McAfee, Inc., Santa Clara, CA (US)

( * ) Notice: Subject to any disclaimer, the term of this patent is extended or adjusted under 35 U.S.C. 154(b) by 909 days.

This patent is subject to a terminal disclaimer.

(21) Appl. No.: 10/072,108

(22) Filed: Feb. 8, 2002

(51) Int. Cl.
*G08B 23/00* (2006.01)

(52) U.S. Cl. ........................ 726/23; 709/224

(58) Field of Classification Search ................ 713/201; 726/23

See application file for complete search history.

(56) References Cited

U.S. PATENT DOCUMENTS

| | | | | |
|---|---|---|---|---|
| 5,796,942 A | * | 8/1998 | Esbensen | 726/13 |
| 5,991,881 A | * | 11/1999 | Conklin et al. | 726/22 |
| 6,219,706 B1 | * | 4/2001 | Fan et al. | 709/225 |
| 6,816,973 B1 | * | 11/2004 | Gleichauf et al. | 726/13 |
| 2002/0129111 A1 | * | 9/2002 | Cooper | 709/207 |
| 2004/0187032 A1 | * | 9/2004 | Gels et al. | 713/201 |

OTHER PUBLICATIONS www.hackerwatch.org, Anti-Hacker Online Community, May 2002.

* cited by examiner

*Primary Examiner*—Ayaz Sheikh
*Assistant Examiner*—Pramila Parthasarathy
(74) *Attorney, Agent, or Firm*—Zilka-Kotab, PC; Christopher J. Hamaty (57) ABSTRACT

A system, method and computer program product are provided for monitoring intrusion activity utilizing a plurality of firewalls. Initially, network communications are established with a plurality of computers with firewalls over a network. Such firewalls are adapted for collecting information relating to intrusion activity. Once the network communications are established, the information is collected from the firewalls of the computers utilizing the network. Further, a response is transmitted to the firewalls of the computers utilizing the network. The firewalls are adapted for preventing the intrusion activity utilizing the response.

29 Claims, 5 Drawing Sheets

SYSTEM, METHOD AND COMPUTER PROGRAM PRODUCT FOR MONITORING HACKER ACTIVITIES

FIELD OF THE INVENTION

The present invention relates to intrusion detection scanning methods, and more particularly to improving intrusion detection performance.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

There are many methods of detecting and protecting against hackers. For example, passwords, heuristic analysis of network activity, etc. may be used for such purpose. Recently, there has been work to generate central databases of hacker-related information that may be used to identify patterns indicative of intrusion activity, and respond accordingly. One example of such databases may found by reference to www.hackerwatch.org.

Unfortunately, information is manually collected and submitted to central hacker databases such as www.hackerwatch.org. While the aforementioned patterns may be identified automatically using a computer, responses to such pattern identification is also a manual process involving notification of the appropriate agencies, and reporting to the public via various security services.

There is thus a need for a system and method of automatically collecting hacker-related information in a central database, and then utilizing such information in an automated response.

DISCLOSURE OF THE INVENTION

A system, method and computer program product are provided for monitoring intrusion activity utilizing a plurality of firewalls. Initially, network communications are established with a plurality of computers with firewalls over a network. Such firewalls are adapted for collecting information relating to intrusion activity. Once the network communications are established, the information is collected from the firewalls of the computers utilizing the network. Further, a response is transmitted to the firewalls of the computers utilizing the network. The firewalls are adapted for preventing the intrusion activity utilizing the response.

In one embodiment, the information may be heuristically analyzed to ascertain intrusion activity. Further, rules may be generated for preventing the intrusion activity utilizing the firewalls. The aforementioned response may include such rules.

In another embodiment, the information may be collected by the firewalls automatically. Further, the information may be collected by the firewalls periodically. As an option, the information may be transmitted utilizing an HTTP protocol.

From the perspective of each firewall, information relating to intrusion activity associated with a computer is initially collected. Further, the information is transmitted from the firewall associated with the computer to a central server utilizing the network. A response from the central server is then received utilizing the network. As mentioned before, the firewall is adapted for preventing the intrusion activity utilizing the response.

Another system, method and computer program product are provided for reporting intrusion activity utilizing a plurality of firewalls. Initially, network communications are established with a plurality of computers with firewalls over a network. Such firewalls are adapted for collecting information relating to intrusion activity. Next, the information is collected from the firewalls of the computers utilizing the network. Subsequently, the information is analyzed to ascertain intrusion activity. Further, a source of the ascertained intrusion activity is identified, and the source of the ascertained intrusion activity is notified.

In one embodiment, the information may be heuristically analyzed. Further, the identification of the source may include identifying an Internet Protocol (IP) address associated with the source of the intrusion activity. Moreover, the identification of the source may further include looking up an electronic-mail address based on the IP address.

In another embodiment, the notification may include an electronic mail message. Further, the notification may include a summary of the intrusion activity.

In still another embodiment, it may be determined whether a response to the notification has been received. If it is determined that the response to the electronic-mail has not been received, the source of the intrusion activity may be reported to a central intrusion activity watch service. As an option, the central intrusion activity watch service may notify the public of the source of the intrusion activity via a web interface.

DESCRIPTION OF THE PREFERRED EMBODIMENTS

Figure 1:
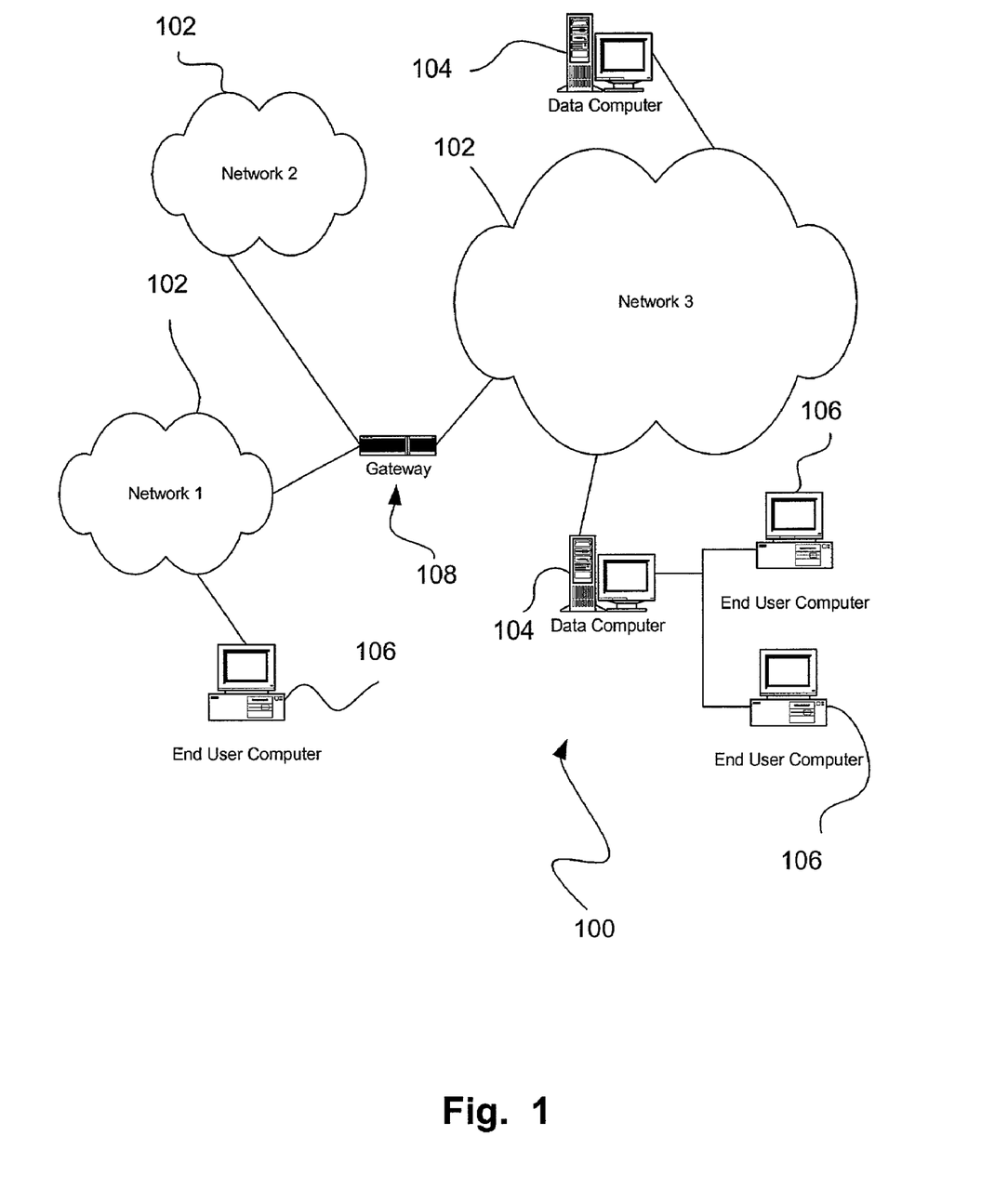
FIG. 1 illustrates an exemplary network environment, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data computers 104 which are capable of communicating over the networks 102. Also coupled to the networks 102 and the data computers 104 is a plurality of end user computers 106. In the context of the present description, such computers may include a web server, desktop computer, lap-top computer, hand-held computer, printer or any other type of hardware/software network device. More detail regarding an exemplary embodiment of such data computers 104 and user computers 106 will be set forth hereinafter during reference to FIG. 2. A gateway 108 may optionally be coupled between the various computers.

A plurality of the data computers 104 or user computers 106 may be each equipped with a firewall. In one example, the firewalls may each include a software application installed directly on the data computers 104 or user computers 106 in the form of personal firewalls. Of course, other traditional approaches may also be employed, such as utilizing a separate hardware component between the computer and the network.

The firewalls installed on the data computers 104 or user computers 106 may be equipped with the ability of monitoring intrusion activity. Initially, network communications are established with a plurality of the computers with the firewalls over a network. This may be carried by a central server or the like. In use, the firewalls are adapted for collecting information relating to intrusion activity.

Once the network communications are established, the information is collected from the firewalls of the computers utilizing the network. Further, a response is transmitted to the firewalls of the computers utilizing the network. The firewalls are then adapted for preventing the intrusion activity utilizing the response. More information regarding an exemplary embodiment that employs this technique will be set forth in greater detail during reference to FIG. 3.

In addition to the collection of information, the present firewall system may further be adapted for reporting intrusion activity. Initially, network communications are established with the computers over a network. Next, the information is collected from the firewalls of the computers utilizing the network. Subsequently, the information is analyzed to ascertain intrusion activity. Further, a source of the ascertained intrusion activity is identified, and the source of the ascertained intrusion activity is notified of the intrusion activity. More information regarding an exemplary embodiment that employs this technique will be set forth in greater detail during reference to FIG. 4.

Figure 2:
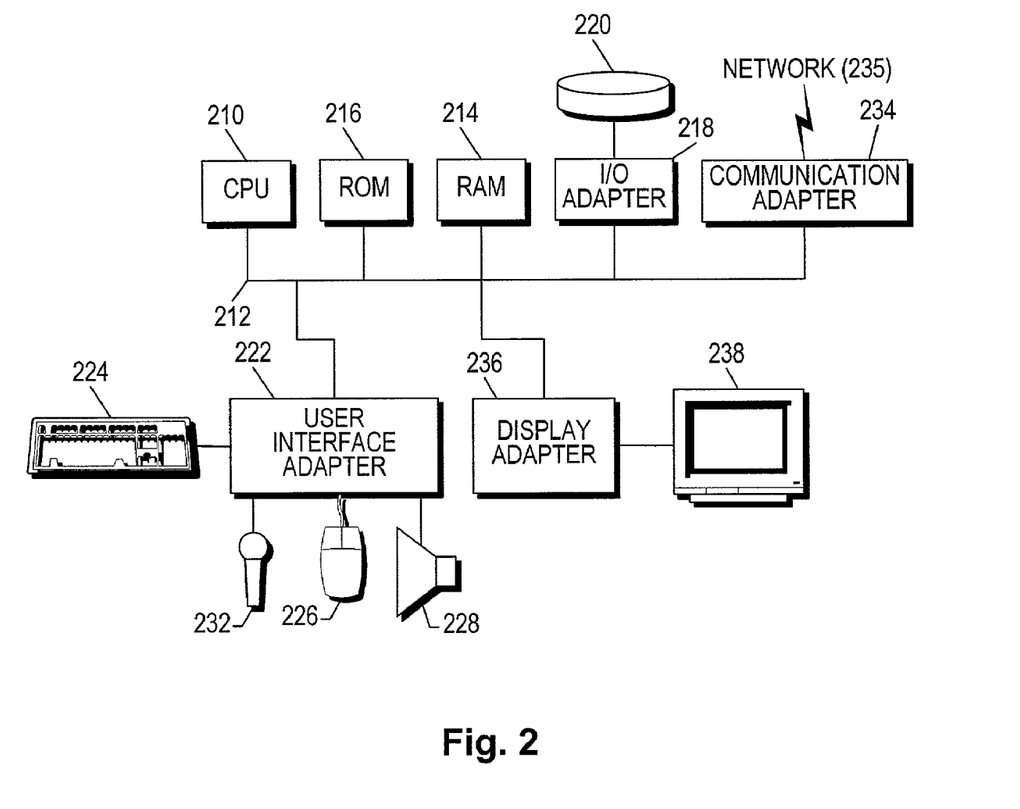
FIG. 2 shows a representative hardware environment associated with the computers of FIG. 1.

FIG. 2 shows a representative hardware environment that may be associated with the data computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
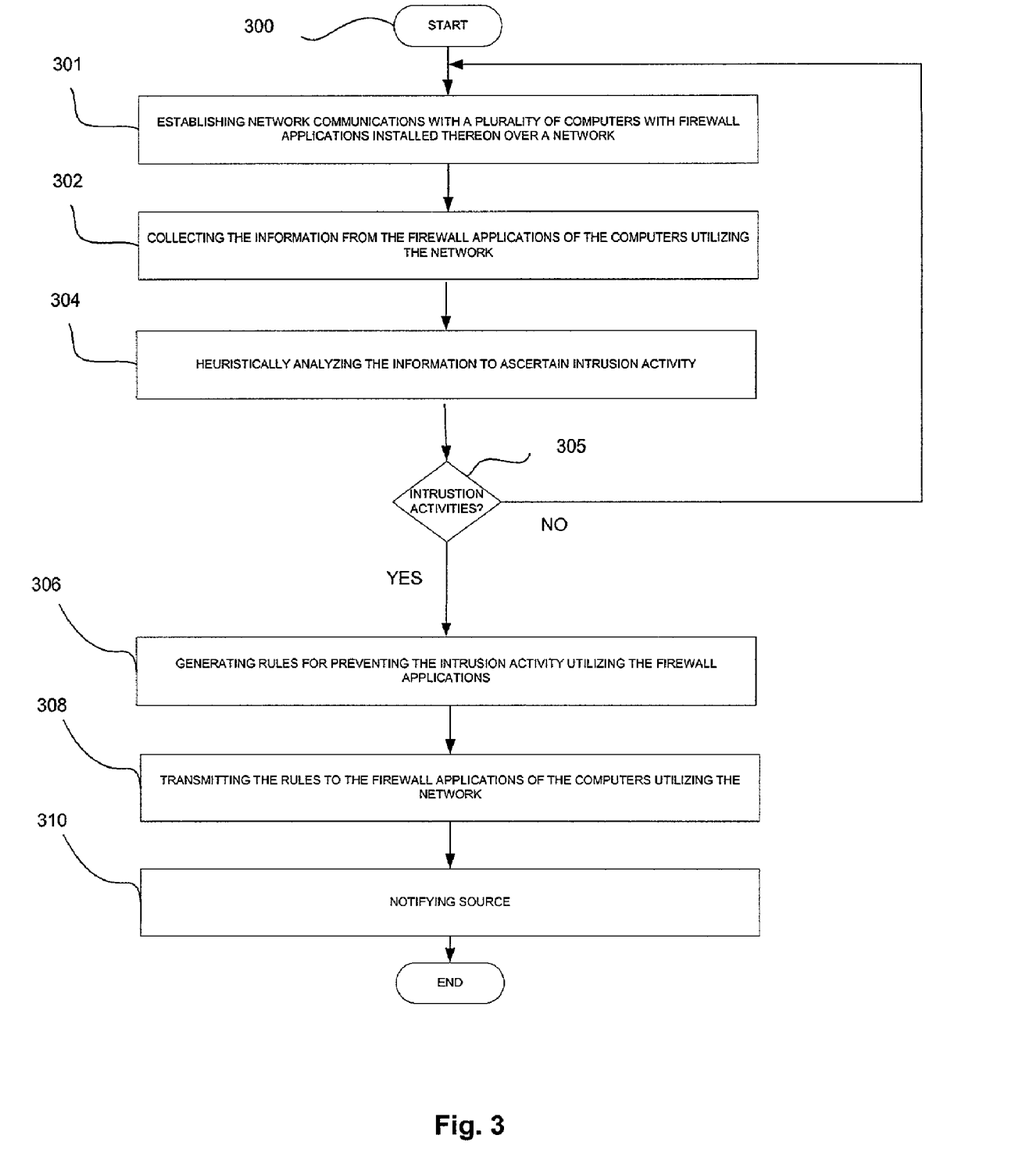
FIG. 3 is a flowchart of a method for monitoring intrusion activity, in accordance with one embodiment.

FIG. 3 is a flowchart of a method 300 for monitoring intrusion activity, in accordance with one embodiment. As an option, the present method 300 may be carried out in the context of the network architecture 100 of FIG. 1. Of course, however, the present method 300 may be executed in any desired context and environment.

As shown in FIG. 3, network communications are initially established with a plurality of computers with firewalls over a network. See operation 302. As mentioned earlier, the firewalls are adapted for collecting information relating to intrusion activity. In the context of the present description, intrusion activity may refer to any information that is indicative of or is capable of being used to identify any security-related activity (i.e. an intrusion, virus, hacker activity, security breach, etc.). Once the communication is established, the information is collected from the firewalls of the computers utilizing the network in operation 302. As an option, the information may be transmitted utilizing an HTTP protocol.

The establishment of the communication and the collection of the information may take any desired form. For example, a central server may broadcast requests to the firewall-equipped computers for intrusion activity information. These requests may be broadcasted automatically, periodically, etc. Of course, the intrusion activity information may be sent to the central server without the computer having any way of knowing that the information is indicative of intrusion activity. In such case, the central server may be relied upon to identify the intrusion activity. Of course, the firewall-equipped computers may be adapted to manually or automatically send such information in response to the detection of intrusion activity at the computer.

Once the information is collected by the central server, the information is analyzed to ascertain intrusion activity in operation 304. As an option, this may be accomplished heuristically. See operation 304. For example, the information may be analyzed for patterns that are indicative of intrusion activity. For reasons that will soon become apparent, the analysis may also include the identification of a source of the intrusion activity.

By way of example, if it is found that a large number of computers are the subject of the same port scans, this may be assumed to indicate intrusion activity. In another example, if a large number of computers receive an email with the phrase "OPEN ATTACHMENT" in the subject header, this too may be considered intrusion activity. Of course, any other analysis may be used which is capable of detecting intrusion activity.

Once any intrusion activity is identified (see decision 305), rules may be generated for preventing the intrusion activity utilizing the firewalls. See operation 306. Next, in operation 308, the rules are transmitted to the firewalls of the computers utilizing the network.

In the context of the present description, the rules may include any filtering criteria capable of being used by the firewalls to deter or prevent the intrusion activity. In the context of the aforementioned examples, the rules may include the prevention of communication on the ports that were being scanned by a possible hacker, and the blocking of any email with the subject header including: "OPEN ATTACHMENT". Of course, various alarms, notifications or the like may be used to notify the user of the implementation of such rules, and any filtering carried out as a result thereof.

If there is identification of any intrusion activity, a source of the intrusion activity may be notified. See operation 310. The purpose of such notification may be to provide the administrator of the source with the opportunity to correct any infected machines and/or put a hacker on notice that his or her activity is being monitored. More information regarding such notification process will be set forth during reference to FIG. 4.

From the perspective of the firewalls on the computers, the foregoing information collection process may begin by collecting the information relating to intrusion activity, after which the information is transmitted from the firewall to the central server utilizing the network. A response from the central server is then received utilizing the network. As mentioned before, the firewall is adapted for preventing the intrusion activity utilizing the response.

As an option, each user may be provided with an option to sign up with the present service. In order to report events to the service via the service, such sign up process may be required. Signing up allows submissions to be tracked and allows the service to provide a notification if the central server needs more information or further action from the user. The sign up process may also be important to confirm any information received. All email addresses provided to the central server may be kept confidential. If a request for additional information is made by an ISP, that request may be routed through the central server without the user email address being exposed. Once a user signs up, the server emails the user a custom ID number. Such ID number may then be used during subsequent manual or automatic submissions.

Figure 4:
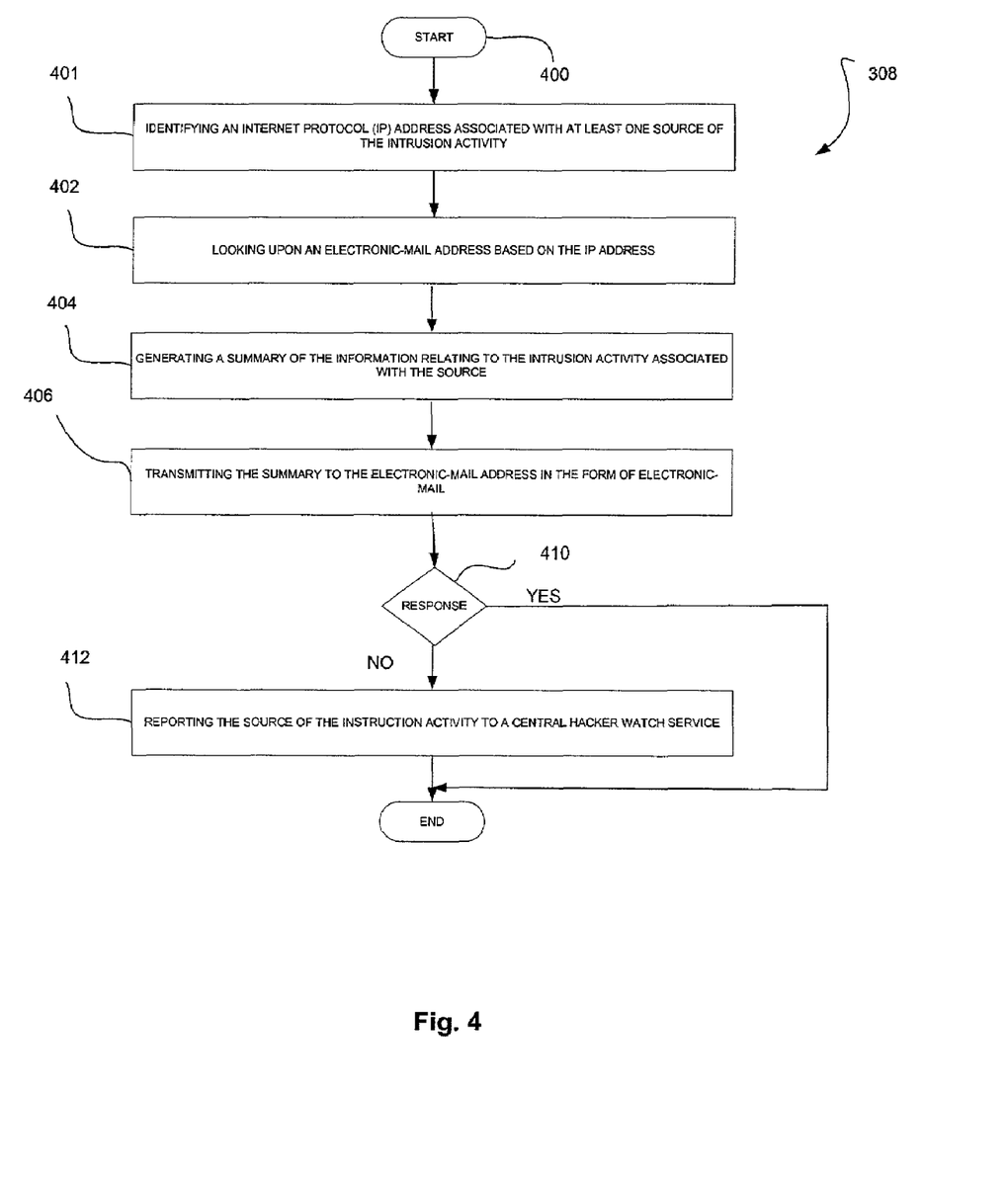
FIG. 4 illustrates a method for notifying a source of intrusion activity, in accordance with operation 310 of FIG. 3.

FIG. 4 illustrates a method 400 for notifying a source of intrusion activity, in accordance with operation 310 of FIG. 3. As an option, the present method 400 may be carried out in the context of the network architecture 100 of FIG. 1 and the method 300 of FIG. 3. Of course, however, the present method 400 may be executed in any desired context and environment.

Initially, an Internet Protocol (IP) address associated with at least one source of the intrusion activity is identified in operation 401. This may be accomplished by initiating a trace, or via any other feasible technique. Next, in operation 402, an electronic-mail address is looked up based on the IP address. This may be accomplished utilizing publicly available databases, or a related service.

Further a summary of the information relating to the intrusion activity associated with the source may be generated. See operation 404. Just by way of example, a number of known computers targeted by the source may be summarized, as well as the specific activity detected.

Next, in operation 406, the summary is transmitted to the electronic-mail address in the form of electronic-mail. Of course, this notification may take any other form such as ground mail, fax, telephone call, etc. Ideally, the notification further requests a response from the source in a form including, but not limited to an acknowledgement of the notification, indication that the intrusion activity is being remedied, etc.

It is then determined in decision 410 as to whether a response to the electronic-mail is received. If it is determined that the response to the electronic-mail is received, the process may be logged and terminated.

If, however, it is determined that the response to the electronic-mail is not received, the source of the intrusion activity may be reported to a central intrusion activity watch service. See operation 412. Similar to before, this may take the form of an electronic-mail or any other desired transmission including or excluding the generated summary. As an option, the report may be sent if the response is not received within a certain time period, or if a response is unsatisfactory based on any desired criteria.

The central intrusion activity watch service works to notify the public of the source of the intrusion activity via a web interface. Further, broadcast e-mails may be sent to subscribers (i.e. licensees of the firewall and related service).

Figure 5:
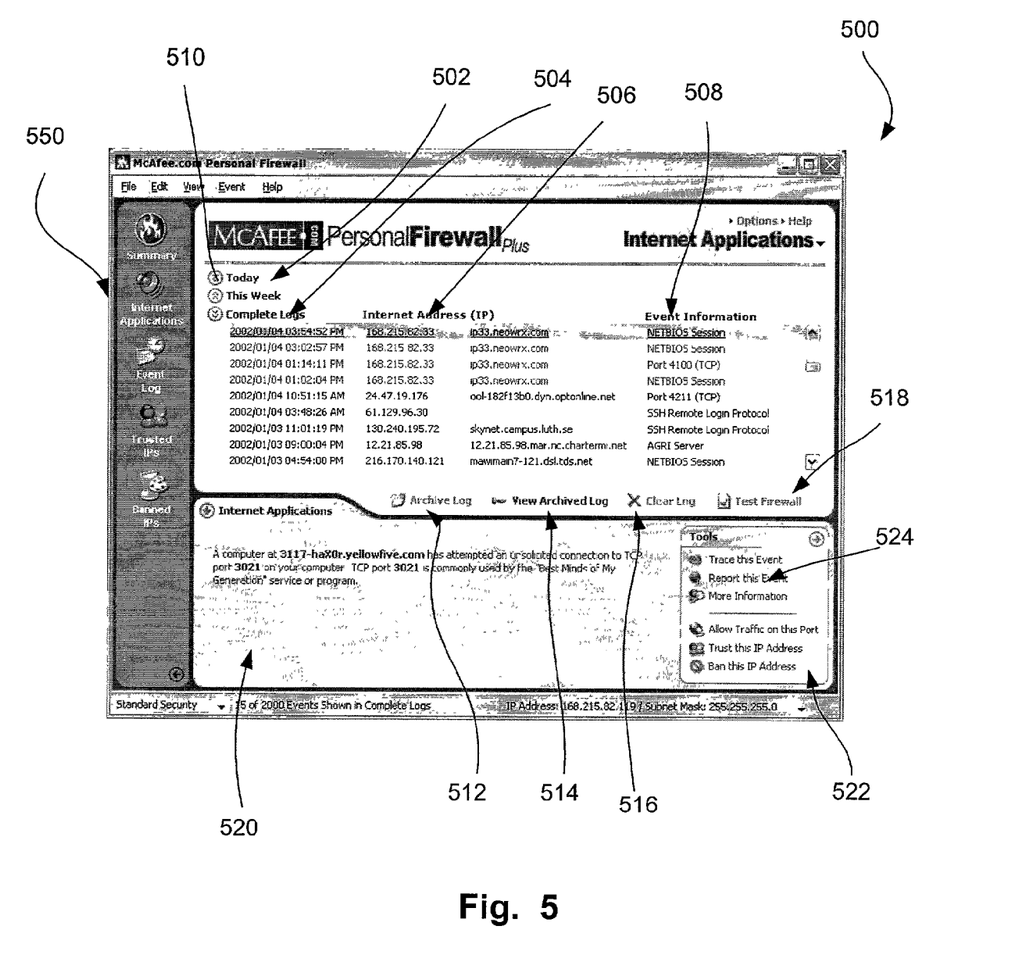
FIG. 5 illustrates an exemplary event log illustrating various traffic events that may be monitored and collected by the firewall.

FIG. 5 illustrates an exemplary event log 500 illustrating various traffic events collected and reported by the firewall. As shown, various categories 502 of traffic events are shown. For example, a "Today" category, a "This Week" category, as well as a "Total" category may be provided. Further, various information may be displayed regarding each event, such as the time and date 504 when the traffic event was logged, the associated Internet Protocol (IP) address 506, and other related event information 508. During use, any of the listed events in the event log 500 may be selected.

Additional features may also be provided. For example, the various lists of traffic events under each category 502 may be collapsed and expanded as desired by selecting icons 510. By this feature, a user may focus on a category of interest. As a further option, the event log 500 may be archived upon the selection of an archive icon 512. Still yet, an archived event log 500 may be accessed via a view archived log icon 514. The present event log 500 may even be cleared using a clear event log icon 518.

Upon the selection of any of the traffic events in the event log 500, a lower portion 520 of the event log 500 may be reserved for additional information relating to the selected event. Such information may include, but is not limited to applications associated with the selected event.

As an option, the menu 550 may be simultaneously displayed in conjunction with the event log 500 for providing the user quick and efficient access to other optional features such as a summary page, a list of trusted and banned IP addresses, etc.

Still another portion 522 of the event log 500 may include a plurality of tools for processing a selected traffic event. For example, a report icon 524 may be selected in order to transmit intrusion activity information to the central server for analysis in a manual fashion.

Thus, the present embodiment provides a framework with which a large number of firewalls may be used to collect intrusion activity information, and a central server can identify intrusion activity using information and push rules to all of the firewalls to prevent the intrusion activity, and the source of the intrusion activity may be notified. Still yet, the source may be reported and put on a watch list if a response to the notification is unsatisfactory.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring intrusion activity utilizing a plurality of firewalls, comprising:
   (a) establishing network communications between a server computer and a plurality of client computers with firewalls over a network, wherein the firewalls are adapted for collecting information relating to intrusion activity, and include a list of trusted and banned addresses;
   (b) collecting the information from the firewalls of the client computers utilizing the network, for identifying similar intrusion activity across a subset of the plurality of client computers; and
   (c) transmitting a response to the firewalls of each of the plurality of client computers utilizing the network;
   (d) wherein the firewalls are adapted for preventing the similar intrusion activity across each of the plurality of client computers utilizing the response.

2. The method as recited in claim 1, and further comprising heuristically analyzing the information to ascertain the similar intrusion activity.

3. The method as recited in claim 1, and further comprising generating rules for preventing the similar intrusion activity utilizing the firewalls.

4. The method as recited in claim 3, wherein the response includes the rules.

5. The method as recited in claim 1, wherein the information is collected by the firewalls automatically.

6. The method as recited in claim 5, wherein the information is collected by the firewalls periodically.

7. The method as recited in claim 1, wherein the information is transmitted utilizing an HTTP protocol.

8. A system for monitoring intrusion activity utilizing a plurality of firewalls, comprising:
   (a) logic for establishing network communications between a server computer and a plurality of client computers with firewalls over a network, wherein the firewalls are adapted for collecting information relating to intrusion activity, and include a list of trusted and banned addresses;
   (b) logic for collecting the information from the firewalls of the client computers utilizing the network, for identify similar intrusion activity across a subset of the plurality of client computers; and
   (c) logic for transmitting a response to the firewalls of each of the plurality of client computers utilizing the network;
   (d) wherein the firewalls are adapted for preventing the similar intrusion activity across each of the plurality of client computers utilizing the response.

9. A computer program product for monitoring intrusion activity utilizing a plurality of firewalls, comprising:
   (a) computer code for establishing network communications between a server computer and a plurality of client computers with firewalls over a network, wherein the firewalls are adapted for collecting information relating to intrusion activity, and include a list of trusted and banned addresses;
   (b) computer code for connecting the information from the firewalls of the client computers utilizing the network, for identifying similar intrusion activity across a subset of the plurality of client computers; and
   (c) computer code for transmitting a response to firewalls of each of the plurality of client computers utilizing the network;
   (d) wherein the firewalls are adapted for preventing the similar intrusion activity across each of the plurality of client computers utilizing the response.

10. A method for reporting intrusion activity utilizing a plurality of firewalls, comprising:
    (a) establishing network communications between a server computer and a plurality of client computers with firewalls over a network, wherein the firewalls are adapted for collecting information relating to intrusion activity, and include a list of trusted and banned addresses;
    (b) collecting the information from the firewalls of the client computers utilizing the network;
    (c) analyzing the information to ascertain intrusion activity including similar intrusion activity across a subset of the plurality of client computers;
    (d) identifying a source of the ascertained intrusion activity; and
    (e) notifying the source of the ascertained intrusion activity.

11. The method as recited in claim 10, wherein the information is heuristically analyzed.

12. The method as recited in claim 10, wherein the identification of the source includes identifying an Internet Protocol (IP) address associated with at least one source of the intrusion activity.

13. The method as recited in claim 12, wherein the identification of the source further includes looking up an electronic-mail address based on the IP address.

14. The method as recited in claim 10, wherein the notification includes an electronic mail.

15. The method as recited in claim 10, wherein the notification includes a summary of the intrusion activity.

16. The method as recited in claim 10, and further comprising determining whether a response to the notification is received.

17. The method as recited in claim 16, wherein if it is determined that the response to the notification is not received, reporting the source of the intrusion activity to a central intrusion activity watch service.

18. The method as recited in claim 17, wherein the central intrusion activity watch service notifies the public of the source of the intrusion activity via a web interface.

19. A system for reporting intrusion activity utilizing a plurality of firewalls, comprising:
    (a) logic for establishing network communications between a server computer and a plurality of client computers with firewalls over a network, wherein the firewalls are adapted for collecting information relating to intrusion activity, and include a list of trusted and banned addresses;
    (b) logic for collecting the information from the firewalls of the client computers utilizing the network;
    (c) logic for analyzing the information to ascertain intrusion activity including similar intrusion activity across a subset of the plurality of client computers;
    (d) logic for identifying a source of the ascertained intrusion activity; and
    (e) logic for notifying the source of the ascertained intrusion activity.

20. A computer program product for reporting intrusion activity utilizing a plurality of firewalls, comprising:
    (a) computer code for establishing network communications between a server computer and a plurality of client computers with firewalls over a network, wherein the firewalls are adapted for collecting information relating to intrusion activity, and include a list of trusted and banned addresses;
- (b) computer code for collecting the information from the firewalls of the client computers utilizing the network;
- (c) computer code for analyzing the information to ascertain intrusion activity including similar intrusion activity across a subset of the plurality of client computers;
- (d) computer code for identifying a source of the ascertained intrusion activity; and
- (e) computer code for notifying the source of the ascertained intrusion activity.

21. A method for monitoring intrusion activity utilizing a firewall, comprising:

collecting information relating to intrusion activity utilizing a firewall associated with a client computer;

transmitting the information from the firewall associated with the computer to a central server utilizing the network;

receiving a response from the central server utilizing the network;

wherein the firewall is adapted for preventing the intrusion activity utilizing the response;

wherein the central server is adapted for collecting information from a plurality of the client computers for identifying similar intrusion activity across a subset of the plurality of client computers.

22. A method for monitoring intrusion activity utilizing a plurality of firewalls, comprising:
- (a) establishing network communications between a server computer and a plurality of client computers with firewalls over a network, wherein the firewalls are adapted for collecting information relating to intrusion activity, and include a list of trusted and banned addresses;
- (b) collecting the information from the firewalls of the client computers utilizing the network, for identifying similar intrusion activity across a subset of the plurality of client computers;
- (c) heuristically analyzing the information to ascertain the similar intrusion activity;
- (d) generating rules for preventing the similar intrusion activity utilizing the firewalls based on the heuristic analysis;
- (e) transmitting the rules to the firewalls of the each of the plurality of client computers utilizing the network, wherein the firewalls are adapted for preventing the similar intrusion activity across each of the plurality of client computers utilizing the rules;
- (f) identifying an internet Protocol (IP) address associated with at least one source of the similar intrusion activity;
- (g) looking up an electronic-mail address based on the IP address;
- (h) generating a summary of the information relating to the similar intrusion activity associated with the source;
- (i) transmitting the summary to the electronic-mail address in the form of electronic mail;
- (j) determining whether a response to the electronic-mail is received; and
- (k) if it is determined that the response to the electronic-mail is not received, reporting the source of the similar intrusion activity to a central intrusion activity watch service, wherein the central intrusion activity watch service notifies the public of the source of the similar intrusion activity via a web interface.

23. The method as recited in claim 1, wherein the subset of the plurality of client computers includes a large subset of the plurality of client computers.

24. The method as recited in claim 1, wherein the similar intrusion activity includes a similar port scan performed across the subset of the plurality of client computers.

25. The method as recited in claim 1, wherein the similar intrusion activity includes an e-mail with a similar phrase sent across the subset of the plurality of client computers.

26. The method as recited in claim 1, wherein a user of each of the plurality of client computers is required to subscribe in order to track the collected information and confirm the collected information.

27. The method as recited in claim 1, wherein the collected information is included in a report according to categories of events.

28. The method as recited in claim 27, wherein additional information associated with the collected information is reported including a time and date of when the information was collected, an Internet Protocol address associated with the collected information and applications associated with the collected information.

29. The method as recited in claim 27, wherein the report is generated upon selection of a report icon in a graphical user interface.

* * * * *

UNITED STATES PATENT AND TRADEMARK OFFICE
CERTIFICATE OF CORRECTION

PATENT NO. : 7,093,292 B1  Page 1 of 1
APPLICATION NO. : 10/072108
DATED : August 15, 2006
INVENTOR(S) : Pantuso It is certified that error appears in the above-identified patent and that said Letters Patent is hereby corrected as shown below:

col. 7, line 46 change "identify" to --identifying--;
    col. 7, line 63 change "connecting" to --collecting--;
    col. 8, line 1 insert --the-- before "firewalls" and after "to";
    col. 10, line 4 change "internet" to --Internet--;
    col. 10, line 11 change "electronic mail" to --electronic-mail--.

Signed and Sealed this

Ninth Day of February, 2010

David J. Kappos
*Director of the United States Patent and Trademark Office*